United States Patent
Kincaid et al.

[11] Patent Number: 6,076,840
[45] Date of Patent: Jun. 20, 2000

[54] SELF-LOCKING PLUG-IN STABILIZER BAR LINKS

[75] Inventors: Jeffrey L. Kincaid, Clarkston; Scott T. Costello, Ferndale; Talon T. Harvey, Shelby Township, all of Mich.

[73] Assignee: American Axle & Manufacturing, Inc., Detroit, Mich.

[21] Appl. No.: 09/081,113

[22] Filed: May 19, 1998

[51] Int. Cl.⁷ ............................................. B60G 21/055
[52] U.S. Cl. .......................... 280/124.107; 280/93.511; 403/122; 411/55; 411/34; 267/188
[58] Field of Search ............... 280/124.107, 124.137, 280/124.152, 93.511; 267/188; 403/122, 133, 135, 140; 411/55, 80.5, 80.6, 34, 60.1, 60.2, 57.1

[56] References Cited

U.S. PATENT DOCUMENTS

| | | |
|---|---|---|
| 3,282,602 | 11/1966 | Willingshofer et al. . |
| 3,938,822 | 2/1976 | Guerriero . |
| 4,056,037 | 11/1977 | McIntyre ................................... 411/60 |
| 4,429,899 | 2/1984 | Ohno et al. . |
| 4,721,326 | 1/1988 | Massos et al. ........................... 411/60.2 |
| 4,883,287 | 11/1989 | Murakami et al. . |
| 5,064,216 | 11/1991 | Hynds . |
| 5,102,160 | 4/1992 | Stowe . |
| 5,165,306 | 11/1992 | Hellon . |
| 5,352,059 | 10/1994 | Ueno et al. . |
| 5,498,092 | 3/1996 | Fellows ..................................... 403/122 |
| 5,603,583 | 2/1997 | Jackson . |
| 5,702,121 | 12/1997 | Song . |
| 5,707,073 | 1/1998 | Stuker et al. . |
| 5,855,447 | 1/1999 | Nemoto ................................... 403/122 |
| 5,927,891 | 7/1999 | Trumbower et al. ..................... 403/114 |
| 5,954,353 | 9/1999 | Kincaid et al. ................... 280/124.152 |
| 5,957,642 | 9/1999 | Pratt ........................................... 411/55 |

*Primary Examiner*—Peter C. English
*Assistant Examiner*—Lynda Jasmin
*Attorney, Agent, or Firm*—Harness, Dickey & Pierce, P.L.C.

[57] ABSTRACT

The present invention provides a suspension assembly for a motor vehicle including a pair of end links which interconnect the opposite ends of a stabilizer bar to a pair of suspension members. Each end link has a first fastener adapted for connection to the end of the stabilizer bar and a second fastener adapted for connection to the suspension member. In addition, a locking mechanism is provided for securing the first fastener in a socket formed in the hollow end of the stabilizer bar.

23 Claims, 4 Drawing Sheets

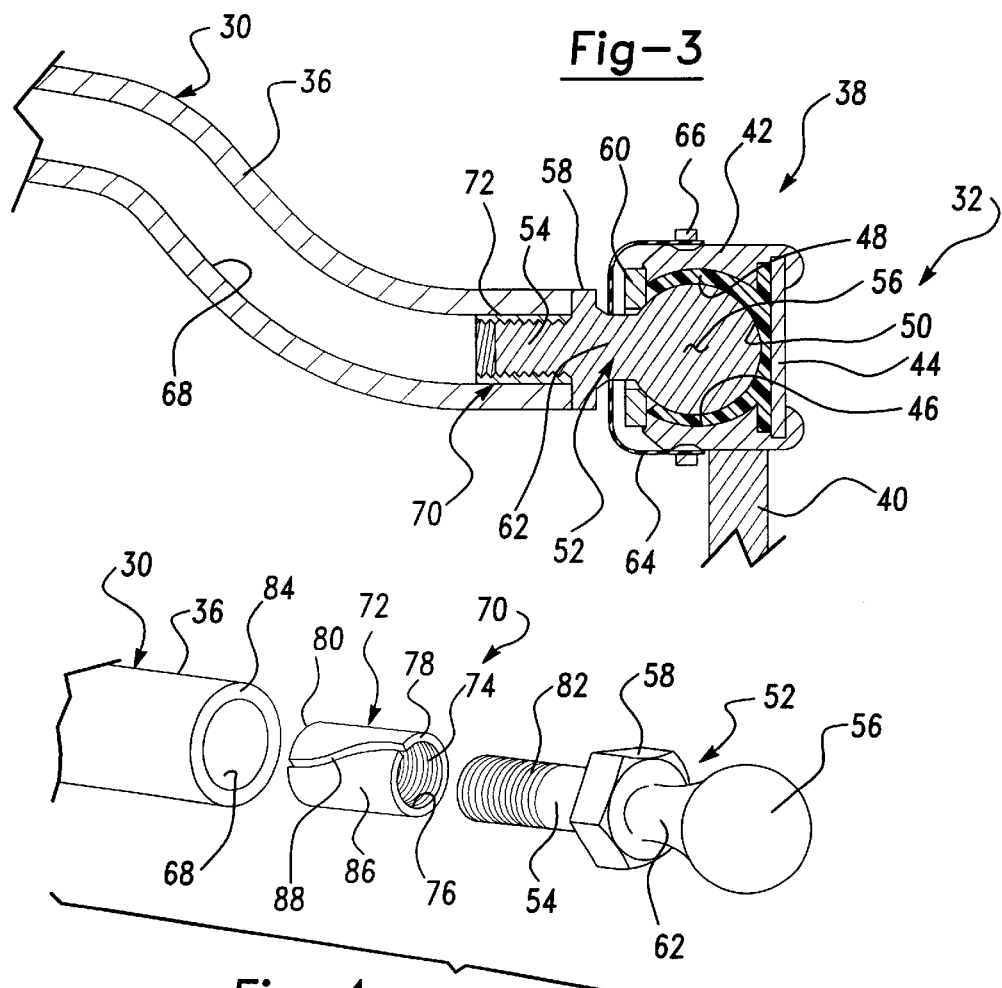
Fig-3
Fig-4
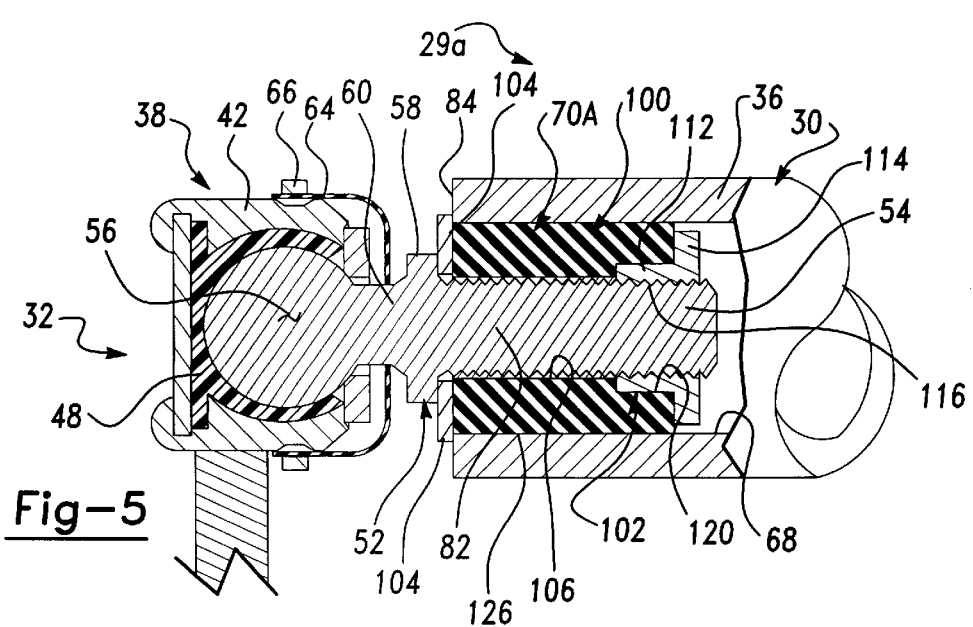
Fig-5

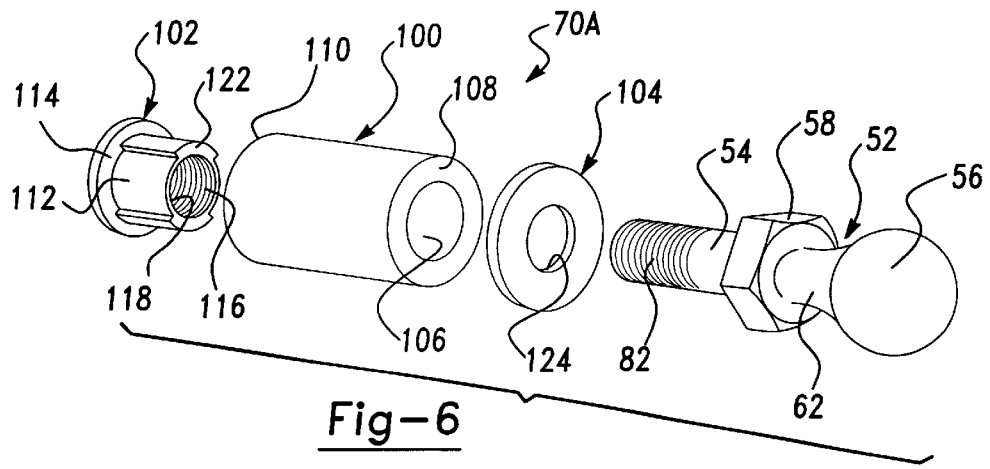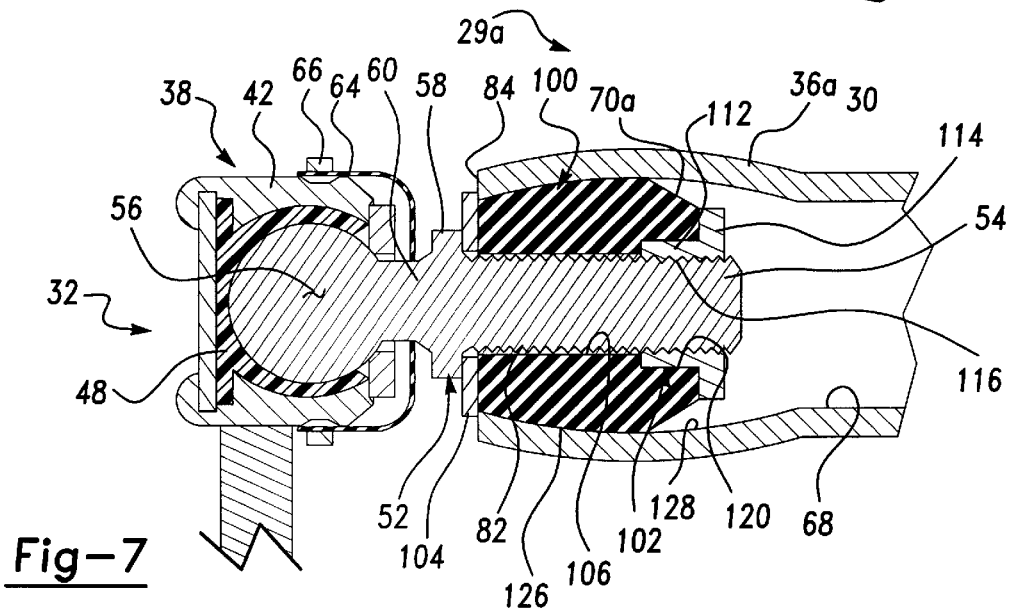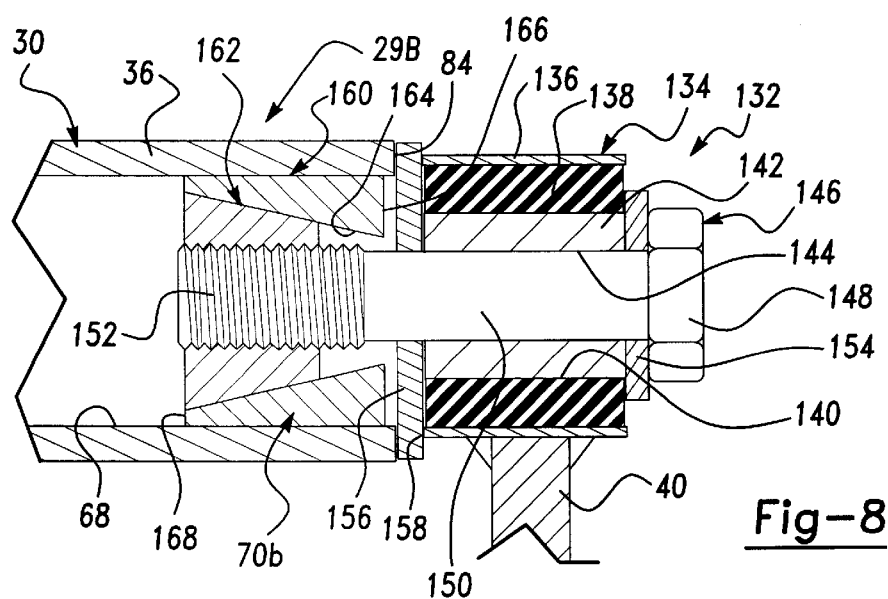

SELF-LOCKING PLUG-IN STABILIZER BAR LINKS

FIELD OF THE INVENTION

The present invention relates generally to motor vehicle suspensions and, more particularly, to an anti-roll system having plug-in end links connecting the hollow ends of a stabilizer bar to suspension components.

BACKGROUND OF THE INVENTION

It is a common practice to equip motor vehicles with an independent suspension for absorbing road shock and other vibrations while providing a smooth and comfortable ride for the vehicle occupants. In suspensions of this type, an anti-roll system is commonly used to increase the roll rigidity and improve the steering stability of the vehicle. Conventional anti-roll systems include a stabilizer bar and a pair of end links which interconnect each end of the stabilizer bar to a pivotable suspension component, such as a control arm. The stabilizer bar has an elongated central segment oriented to extend laterally across the vehicle and arm segments extending from the ends of the central segment to form a generally U-shaped configuration. The central segment of the stabilizer bar is supported for rotation about its own longitudinal axis by one or more mounting brackets which are fixed to the vehicle body or frame. Most commonly, the mounting brackets are positioned in close proximity to the arm segments for minimizing any bending moments which may be induced in the stabilizer bar.

As noted, end links are used to interconnect the distal end of each arm segment of the stabilizer bar to corresponding control arms. The end links function to accommodate the relative angular movement between the stabilizer bar and the control arm caused by the suspension travelling through its range of motion. Stabilizer bars are manufactured with an end form (i.e., eye-form or an apertured paddle) at each end which is adapted to receive a fastener extending from the end link. Some end links are of the "silent block" type and have a threaded fastener, such as a bolt, which extends through a sleeved rubber grommet and the end form. A lock nut is used to secure the bolt to the end form. Another type of end link, commonly referred to as a "direct-acting" end link, is equipped with a ball joint for providing a quicker and stiffer response to suspension motion. In direct-acting links, a threaded shank of the ball stud extends through the end form and is likewise secured thereto using a lock nut.

In an effort to reduce complexity, cost and weight of anti-roll systems without sacrificing ride stability and suspension stiffness, the current trend is to use tubular stabilizer bars. As such, particular emphasis has been directed toward developing techniques for attaching the end links to the ends of the tubular stabilizer bar without the need to form an end form. Accordingly, a need exists for techniques and devices which allow direct attachment of the end links to the hollow ends of tubular stabilizer bars that have been cut to length, thereby eliminating the need to perform any metal forming operations on the stabilizer bar, other than bending.

SUMMARY OF THE INVENTION

Accordingly, the objective of the present invention is to provide an anti-roll system for a motor vehicle suspension having a "plug-in" connection between an end link and the hollow end of a stabilizer bar.

As a related object, the anti-roll system includes a locking mechanism for rigidly securing a shank segment of the end link within the hollow end of the stabilizer bar.

As a further object, the locking mechanism functions to rigidly secure a threaded shank segment of the end link within a non-threaded hollow end of the stabilizer bar. To this end, the locking mechanism includes a threaded adapter operable to generate radial forces for securing the locking mechanism within the hollow end of the stabilizer bar in response to tightening of the threaded shank segment into the threaded adapter.

Accordingly, the present invention provides a suspension assembly for a motor vehicle including a pair of end links which interconnect the opposite ends of a stabilizer bar to a pair of suspension members. Each end link has a first member adapted for connection to the end of the stabilizer bar and a second member adapted for connection to the suspension member. In particular, a locking mechanism is provided for securing the first member in a socket formed in the hollow end of the stabilizer bar for securely attaching the stabilizer bar to the end link.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 3 is an enlarged partial view of the anti-roll system shown in FIG. 2 which illustrates a locking mechanism made in accordance with one preferred embodiment of the present invention;

FIG. 4 is an exploded perspective view of the locking mechanism shown in FIG. 3;

FIG. 5 is a partial sectional view of an anti-roll system incorporating locking mechanism made in accordance with another preferred embodiment of the present invention;

FIG. 6 is an exploded perspective view of the locking mechanism shown in FIG. 5;

FIG. 7 is a partial sectional view of the locking mechanism shown in FIGS. 5 and 6 used in association with a modified end segment of the stabilizer bar;

FIG. 8 is a partial sectional view of a locking mechanism made in accordance with yet another preferred embodiment of the present invention.

DETAILED DESCRIPTION OF THE INVENTION

In general, the present invention is directed to an anti-roll system comprised of a stabilizer bar and a pair of plug-in end links connecting the opposite ends of the stabilizer bar to a pair of suspension members in a vehicle suspension. The present invention is adapted to replace most conventional anti-roll systems and includes a locking mechanism which permits direct attachment of the plug-in end link to the hollow end of tubular stabilizer bars. Thus, the present invention may be utilized with a wide variety of vehicular suspensions and is not intended to be limited to the particular application described herein.

Figure 1:
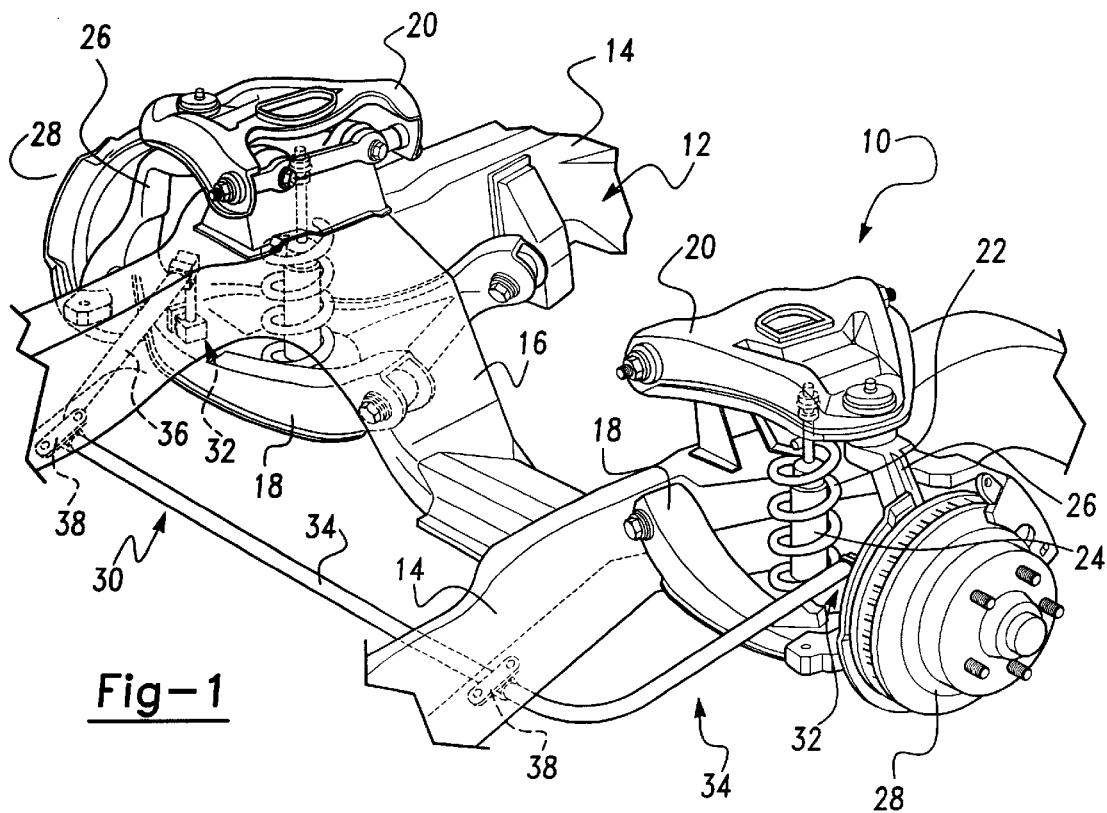
FIG. 1 is a perspective view of an exemplary independent front wheel suspension into which the anti-roll system of the present invention is incorporated.

Turning now to the drawings, FIG. 1 shows an exemplary independent front wheel suspension, generally identical by reference numeral 10, of the type having suspension components at each wheel which are suspended from the vehicle frame. Reference will be made to a vehicle frame in the present disclosure, yet those skilled in the art will recognize that many current vehicles do not have a frame as such but, instead, have regions of the body which act as an integrated frame structure. With this in mind, frame 12 is shown to partially include a pair of longitudinal side rails 14 and a crossbeam 16.

At each wheel, suspension 10 includes a lower control arm 18 and an upper control arm 20 which are both pivotally attached to frame 12. A strut assembly having a helical coil spring 22 and a strut damper 24 is retained between an intermediate portion of lower control arm 18 and frame 12 to support the weight of the vehicle body and any loads which are transmitted through lower control arm 18. Upper control arm 20 is connected to lower control arm 18 by a steering knuckle 26. A hub and rotor assembly 28 is rotatably attached to a spindle portion (not shown) of steering knuckle 26 such that a wheel and tire (also not shown) may be mounted thereon. Suspension 10 further includes an anti-roll system 29 comprised of a stabilizer bar 30 and a pair of end links 32 which connect the ends of stabilizer bar 30 to lower control arms 18. Stabilizer bar 30 is shown to include an elongated central segment 34 which extends laterally across the vehicle and a pair of arm segments 36 which extend longitudinally along the vehicle at each end of central segment 34. Central segment 34 is rotatably attached to frame rails 14 by a pair of mounting brackets 38. The distal end of each arm segment 36 is connected to a corresponding one of lower control arms 18 by one of end links 32.

As will be described in connection with each embodiment of anti-roll system 29, a locking mechanism is provided for directly connecting a threaded fastener associated with end link 32 into a non-threaded socket provided in the terminal end of each arm segment 36. Thus, the present invention is applicable to anti-roll systems having "plug-in" type end links adapted for receipt and retention in the hollow ends of stabilizer bar 30. The hollow ends may be formed by drilling a bore in the ends of a solid stabilizer bar or, more preferably, may be defined by the terminal ends of a tubular stabilizer bar.

Figure 2:
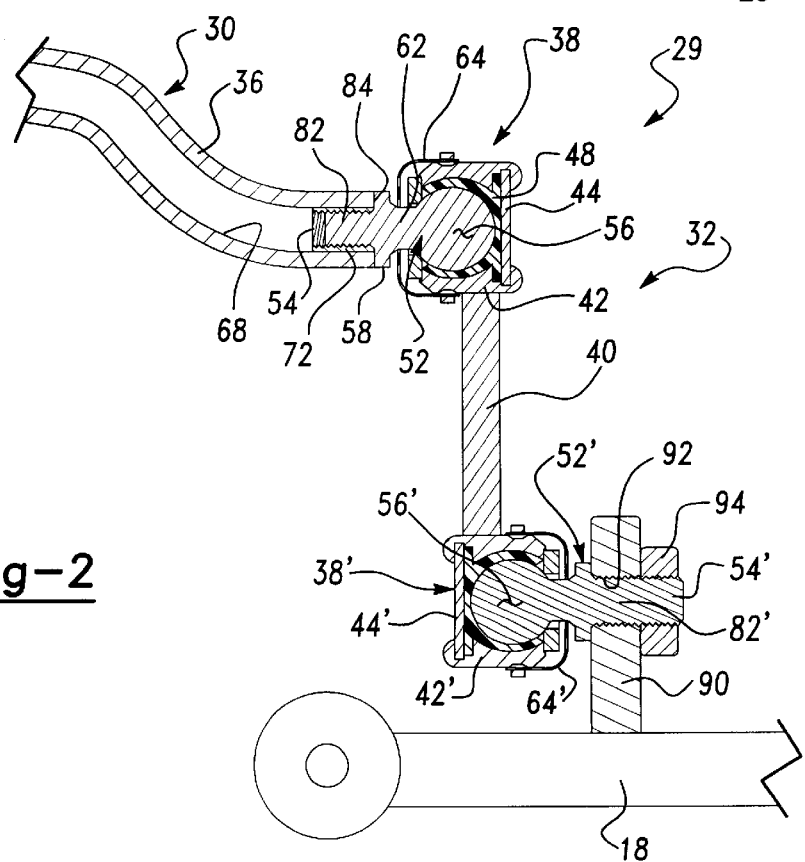
FIG. 2 is a sectional view of a portion of the anti-roll system shown in FIG. 1.

Referring primarily to FIGS. 2 and 3, a "direct-acting" type of end link 32 is shown having one end fastened to stabilizer bar 30 and its opposite end fastened to lower control arm 18. According to the particular embodiment shown, the components of end link 32 are symmetrical, but oppositely oriented, about a plane identified by construction line "A". In fact, end link 32 is assembled from a set of components including two ball joint assemblies 38 and 38' which are rigidly interconnected by suitable means such as, for example, a bar or rod 40. Due to the similarity of the components associated with ball joint assembly 38' with respect to the components of ball joint assembly 38, its components are identified with the same reference numerals but having a primed designation.

Ball joint assembly 38 includes a hollow cylindrical housing 42 fixedly secured to, or integrally formed with, rod 40. A disc-shaped end cap 44 is retained in housing 42 adjacent to its spherical wall 46 for defining a socket cavity therewith. A hollow spherical sleeve 48 is disposed within the socket cavity and defines a spherical socket 50. Ball joint assembly 38 also includes a ball stud 52 having a shank segment 54 and a ball segment 56 interconnected by an integral nut segment 58. Ball segment 56 is disposed in socket 50 and axially retained therein via a spring retainer 60 which is secured to housing 42. Retainer 60 includes a central aperture through which a neck 62 of ball segment 56 extends. A seal boot 64 surrounds neck 62 to enclose ball segment 56 and is secured to housing 42 by a snap ring 66 or other conventional means.

With continued reference to FIGS. 2 and 3, the distal end of arm segment 36 of stabilizer bar 30 is shown to include a socket defined by a non-threaded axial bore 68. As is described in greater detail below, a locking mechanism 70 is provided for securing shank segment 54 of ball stud 52 within bore 68 of stabilizer bar 30. In particular, locking mechanism 70 includes a threaded adapter, hereinafter referred to as locking sleeve 72, which is disposed (i.e., press fit) in bore 68. Locking sleeve 72 has internal threads 74 formed in a bore 76 extending between its end walls 78 and 80. Threads 74 are adapted to receive external threads 82 formed on shank segment 54 of ball stud 52. As will be detailed, threaded tightening of ball stud 52 into locking sleeve 72 causes the outer dimension of locking sleeve 72 to increase, thereby forcibly urging outer wall surface 86 of locking sleeve 72 into frictional engagement with the wall surface of bore 68. As is obvious, nut segment 58 permits ball stud 52 to be threadably tightened relative to stabilizer bar 30 such that precise length adjustment can also be accommodated during assembly of anti-roll system 29. To accommodate radial expansion of locking sleeve 72 caused by threaded engagement of shank segment 54 in bore 76, locking sleeve 72 includes an expansion slot 88 which extends between end walls 78 and 80. Thus, locking sleeve 72 is an elongated, tubular split-ring component. Although a helically-shaped slot 88 is illustrated, it should be appreciated that other slot orientations could substitute therefore including, but not limited to, an axial or diagonal slot configuration.

As noted, end link 32 is also adapted for connection to control arm 18. To this end, and as best illustrated in FIG. 2, ball joint assembly 38' is connected to a bracket 90 extending from lower control arm 18. Specifically, shank segment 54' of ball stud 52' is inserted through a bore 92 formed in bracket 90. A suitable fastener, such as lock nut 94, is threaded onto threads 82' on shank segment 54' and tightened to a suitable torque level. Optionally, bore 92 may include internal threads for cooperating with external threads 82' on shank segment 54'.

During assembly of end link 32 to stabilizer bar 30, shank segment 54 of ball stud 52 is threaded into axial bore 76 of locking sleeve 72, thereby causing locking sleeve 72 to radially expand which, in turn, increases its outside diameter. As noted, expansion slot 88 accommodates this radial enlargement. As the radial expansion occurs, the frictional engagement between outer wall surface 86 of locking sleeve 72 and the inner wall surface of axial bore 68 in stabilizer bar 30 increases. This frictional engagement or "wedging" is sufficient to withstand all anticipated axial pull-out loads, thereby maintaining the rigid connection between ball stud 52 and stabilizer bar 30. To generate the desired amount of radial expansion, locking sleeve 72 is preferably formed from steel and has an outside diameter equal to or slightly greater than the inside diameter of bore 68 in arm segment 36 of stabilizer bar 30. As such, placement of locking sleeve 72 into axial bore 68 results in a slight reduction in the diameter of axial bore 76. Thereafter, threaded engagement of shank threads 82 with sleeve threads 74 causes radial expansion of locking sleeve 72, thereby increasing frictional engagement of its outer wall surface 86 with the inner wall surface of axial bore 68 in arm segment 36 of stabilizer bar 30.

As an alternative, threaded bore 76 in locking sleeve 72 may be formed with tapered threads which taper from a greater diameter at end wall 78 to a reduced diameter at end wall 80. As such, the radial clamping force generated between locking sleeve 72 and stabilizer bar 30 increase as shank segment 54 of ball stud 52 is threaded further into axial bore 76. While shown to be cylindrical in shape, outer wall surface 86 of locking sleeve 72 can be of any shape which is complementary with the shape of axial bore 68. Thus, locking sleeve 72 can be any component capable of being press fit into a complementary socket formed in the end of arm segment 36 of stabilizer bar 30 and which has a threaded bore capable of receiving a threaded fastener extending from an end link.

An anti-roll system 29a according to an alternative embodiment of the present invention is partially shown in FIGS. 5 and 6 wherein similar components to those previously described are identified by like reference numbers. In general, a locking mechanism 70a is used in place of locking mechanism 70 to secure threaded shank segment 54 of ball stud 52 within non-threaded bore 68 in the end of stabilizer bar 30. More particularly, locking mechanism 70a includes a bushing 100, a threaded adapter 102, and a washer 104. Bushing 100 is disposed in non-threaded bore 68 of stabilizer bar 30 and is preferably made of rubber or any other suitable elastomeric material. Bushing 100 has a non-threaded axial bore 106 formed between its end walls 108 and 110 which is sized to permit shank segment 54 of ball stud 52 to pass therethrough. Washer 104 is mounted on shank segment 54 of ball stud 52 and is disposed between nut segment 58 and end surface 84 of stabilizer bar 30 so as to abut end wall 108 of bushing 100. Adapter 102, hereinafter referred to as capture nut, has a tubular hub segment 112 and a radial flange segment 114. Internal threads 116 are formed in a bore 118 extending through tubular segment 112 and radial segment 114 of capture nut 102. Threads 116 are adapted to receive threads 84 of shank segment 54 of ball stud 52. Capture nut 102 is further adapted to be retained in a retention cavity 120 extending inwardly from end wall 110 of bushing 100 such that bore 118 of capture nut 102 is coaxially aligned with bore 106 in bushing 100. Radial flange segment 114 is shown to overlap end wall 110 of bushing 100 when hub segment 112 is seated within retention cavity 120 of bushing 100. Hub segment 112 of capture nut 102 also includes a plurality of circumferentially spaced lugs 122 which are adapted to nest within a plurality of complementary pockets (not shown) formed in retention cavity 120 of bushing 100. The insertion of lugs 122 into the pockets in retention cavity 120 prevents capture nut 102 from rotating relative to bushing 100 and stabilizer bar 30 as shank segment 54 of ball stud 52 is threaded into internal threads 116 formed in bore 118 of capture nut 102.

With capture nut 102 non-rotatably retained in retention cavity 120, bushing 100 is press-fit into axial bore 68 in arm segment 36 of stabilizer bar 30. Thereafter, shank segment 54 of ball stud 52 is passed through an aperture 124 in washer 104 and axial bore 106 in bushing 100 until threads 82 on shank segment 54 are threaded into internal threads 116 in bore 118 of capture nut 102. Alternatively, washer 104, bushing 100 and capture nut 102 may be preassembled and secured on shank segment 54 prior to insertion of locking mechanism 70a into axial bore 68 in the end of stabilizer bar 30. Regardless, the engagement of the opposite face surfaces of washer 104 with nut segment 58 and end surface 84 of stabilizer bar 30 causes axial compression of bushing 100 in response to tightening rotation of shank segment 54 of ball stud 52. As shank segment 54 is rotated, capture nut 102 is drawn toward washer 104, thereby axially compressing bushing 100 between washer 104 and radial flange segment 114. However, this axial compression of bushing 100 also results in radial expansion of bushing 100. Such radial expansion of bushing 100 increases the frictional engagement between its outer radial surface 126 and the inner wall surface of bore 68 in stabilizer bar 30. As such, ball stud 52 is firmly retained (i.e., plugged-in) within axial bore 68 of stabilizer bar 30 by locking mechanism 70a. Optionally, washer 104 may be eliminated if the radial dimension of integral nut 58 is such that it engages end surface 84 of stabilizer bar 30, whereby end wall 108 of bushing would compress against nut 58.

Referring to FIG. 7, anti-roll system 29a is shown with locking mechanism 70a retained in an enlarged, generally bulbous, cavity 128 formed in a modified end portion of arm segment 36a on stabilizer bar 30. In particular, the right cylindrical end portion of arm segment 36 shown in FIG. 5 is upset, via a deformation operation, to define cavity 128 which communicates with bore 68, As previously described, locking mechanism 70a functions such that rotation of threaded shank 54 of ball stud 52 causes capture nut 102 to axially compress and radial expand bushing 100 which, in turn, causes its outer wall surface 126 to engage the inner wall surface of cavity 128. Use of locking mechanism 70a with the modified end portion of stabilizer bar 30 may provide greater resistance to axial pullout loads. While bushing 100 is shown in FIG. 6 to be cylindrical, it is contemplated that it may alternatively be of a different shape (i.e., barrel-shaped) with its outer surface 126 having a large diameter that is greater than the diameter of the opening in terminal end 84 of arm segment 36a. Such a bushing would be pressed into cavity 128 prior to threaded engagement of shank 54 with capture nut 102.

Figure 9:
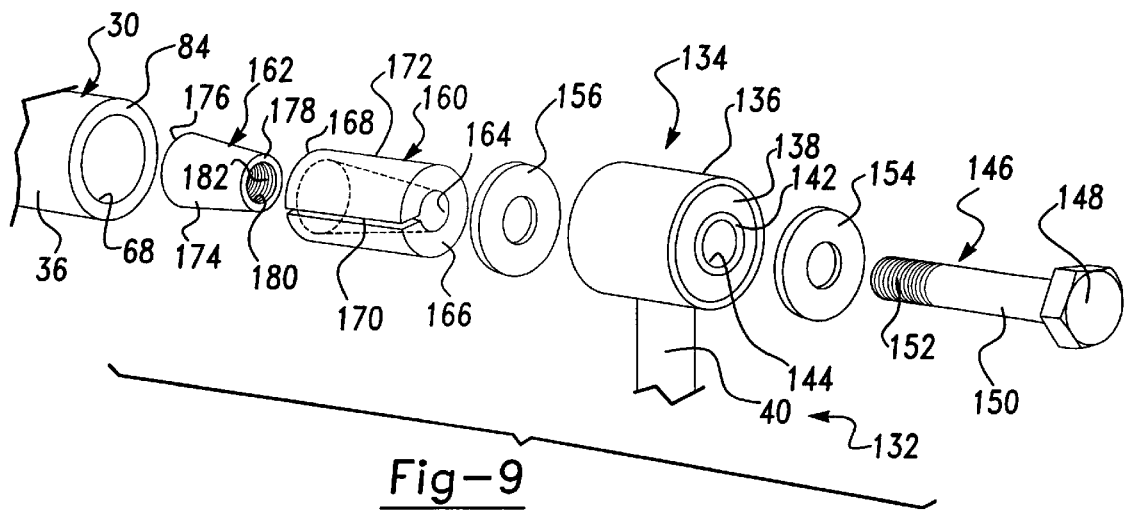
FIG. 9 is an exploded perspective view of the locking mechanism shown in FIG. 8.

Referring now to FIGS. 8 and 9, an anti-roll system 29b in accordance with yet another embodiment of the present invention is shown. However, unlike the previous embodiments, a "silent-block" type of end link 132 is shown interconnected by a locking mechanism 70b to the socket formed in the hollow end of stabilizer bar 30. Thus, those skilled in the art should recognize that each locking mechanism disclosed in this application can be used with direct-acting end links 32, silent-block end links 132, combination direct-acting/silent-block end links, as well as any other link components having a threaded male member which can be plugged-in to a non-threaded female socket in the end of a stabilizer bar and secured therein by one of the locking mechanisms.

End link 132 is assembled from a pair of bushing assemblies 134 (one shown) that are rigidly interconnected by rod 40. One bushing assembly 134 is adapted for connection to stabilizer bar 30 while the other is adapted for connection to control arm 18. Bushing assembly 134 includes a hollow housing 136 fixedly secured to, or integrally formed with, rod 40. A rubber grommet 138 is mounted in housing 136 and is formed to include an axial bore 140. A hollow sleeve 142 is shown retained in bore 140 and defines an axial guide bore 144. A threaded fastener, such as a bolt 146, is used in conjunction with locking mechanism 70b for connecting end link 132 to stabilizer bar 30. Bolt 146 has a hex-shaped head segment 148 and a shank segment 150 on which external threads 152 are formed. As seen, shank segment 150 is passed through an aperture in a washer 154 prior to being inserted through guide bore 144 in sleeve 142. A second washer 156 is mounted on shank segment 150 and its opposite face surfaces are adapted to engage an edge surface 158 of housing 136 and end surface 84 of stabilizer bar 30.

Locking mechanism 70b is provided for directly securing shank segment 150 of bolt 146 within non-threaded bore 68 of stabilizer bar 30. In general, locking mechanism 70b includes a lock sleeve 160 and a threaded adapter 162. Lock sleeve 160 is adapted to be positioned within bore 68 of stabilizer bar 30 and has a non-threaded tapered aperture 164 extending between its end walls 166 and 168. Preferably, bore 164 is conically-shaped and tapers from a greater diameter at end wall 168 to a reduced diameter at end wall 168 for defining a frustoconical socket. The smaller diameter of bore 164 at end wall 166 of lock sleeve 160 is sized to permit threads 152 on shank segment 150 of bolt 146 to pass therethrough without interference. Lock sleeve 160 further includes an expansion slot 170 extending between end walls 166 and 168 and which provides communication between aperture 164 and outer surface 172 of sleeve 160. Thus, locking sleeve 160 is an elongated, tubular split ring component. Lock sleeve 160 is preferably made from steel but may, alternatively, be formed from a hard yet compliant elastomeric material such as rubber.

As noted, locking mechanism 70b also includes threaded adapter, hereinafter referred to as wedge nut 162. Wedge nut 162 has a conically-tapered outer surface 174 which tapers from a greatest diameter at its end wall 176 to a reduced diameter at its end wall 178. In particular, tapered outer surface 174 of wedge nut 162 is adapted to be complementary to the tapered inner surface of aperture 164. This "taper-lock" arrangement functions to prevent rotation of wedge nut 162 relative to lock sleeve 160. Wedge nut 162 further includes a bore 180 extending between its end walls 176 and 178 which has internal threads 182 formed therein that are adapted to receive external threads 152 on shank segment 150 of bolt 146. Tightening of bolt 146 causes wedge nut 162 to be drawn further into lock sleeve 160 which, due to engagement of outer surface 174 with inner surface 164, causes radial expansion of lock sleeve 160, thereby frictionally clamping outer wall surface 172 against inner wall surface of bore 68. Such radial expansion is accommodated by expansion slot 170. Locking mechanism 70b can be initially installed within bore 68 prior to insertion of threaded shank 150 into threaded bore 180 of wedge nut 162 or, in the alternative, can be preassembled onto threaded shank 150 and then inserted into bore 68. As should be obvious, silent-block end link 132 can be substituted with direct-acting end link 32 such that threaded shank segment 54 of ball stud 52 could be threaded into threaded bore 180 of wedge nut 162 if the use of locking mechanism 70b in association with a direct-acting end link is desired.

Figure 10:
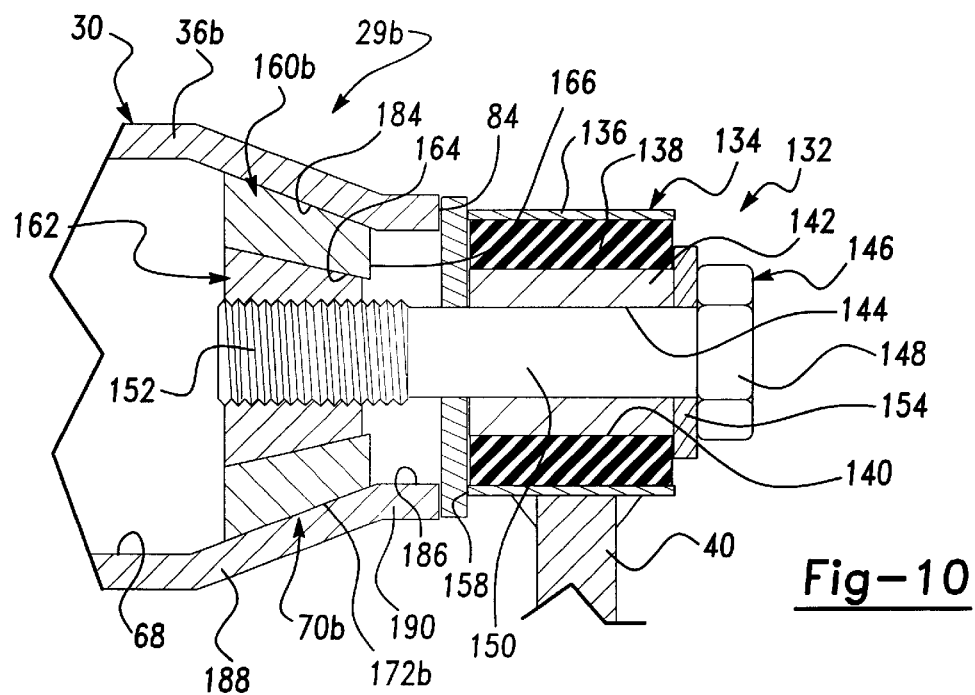
FIG. 10 is a partial sectional view of the locking mechanism shown in FIGS. 8 and 9 used in association with a modified end segment of the stabilizer bar.

FIG. 10 illustrates an alternative arrangement for anti-roll system 29b which differs from the system shown in FIG. 8 and 9 in that locking mechanism 70b now includes a lock sleeve 160b having a conically-tapered outer surface 172b which is adapted to frictionally engage a tapered inner wall surface 184 formed in the end portion of a modified arm segment 36b of stabilizer bar 30. As seen, the modified end portion is designed such that tapered inner wall surface 184 is formed in a conical tubular segment 188 and connects bore 68 to a reduced diameter bore 186 formed in an extruded end segment 190. As before, axial movement of wedge nut 162 into lock sleeve 160b causes radial expansion of lock sleeve 160b, thereby frictionally clamping outer wall surface 172b against inner wall surface 184. The taper-lock between wall surfaces 172b and 184 resists axial pull-out loads applied to locking mechanism 70b.

As opposed to prior art end links, the present invention utilizes a locking mechanism for securing a threaded shank of an end link fastener within a non-threaded socket formed in the distal end of the stabilizer bar. One advantage of these end links is that there is no need to modify the end of a tubular stabilizer bar once it is cut to the appropriate length. As such, the present invention is designed such that there is minimal complexity and lower costs.

Those skilled in the art can now appreciate from the foregoing description that the broad teachings of the present invention can be implemented in a variety of forms. For example, the threads on the ball stud or the bolt may be formed as self-tapping to eliminate the need for forming threads bores in the adapter. Therefore, while this invention has been described in connection with particular examples thereof, the true scope of the invention should not be so limited since other modifications will become apparent to the skilled practitioner upon a study of the drawings, specification, and following claims.

What is claimed is:

1. An anti-roll system for a vehicular suspension comprising:

a stabilizer bar having a hollow end;

an end link having a housing and a shank extending from said housing; and a locking mechanism mounted in said hollow end of said stabilizer bar and adapted to engage said shank for securing said end link to said stabilizer bar.

2. The anti-roll system of claim 1 wherein said hollow end of said stabilizer bar is a non-threaded socket formed in the terminal end thereof, and said shank has external threads formed thereon, and wherein said locking mechanism includes an adapter disposed in said socket which has an internally threaded bore, whereby tightening of said threaded shank into said threaded bore of said adapter causes said locking mechanism to radially expand and be secured within said socket.

3. The anti-roll system of claim 2 wherein said stabilizer bar is a tubular component with said socket defined by an end thereof.

4. The anti-roll system of claim 2 wherein said adapter is a locking sleeve having an outer wall surface which mates with an inner wall surface of said socket, whereby threaded tightening of said threaded shank into said threaded bore in said locking sleeve causes radial expansion of said locking sleeve which causes said outer wall surface of said locking sleeve to be forced against said inner wall surface of said socket.

5. The anti-roll system of claim 4 wherein said locking sleeve is an elongated split ring component having an expansion slot.

6. The anti-roll system of claim 2 wherein said locking mechanism further includes a bushing having an outer wall surface which mates with an inner wall surface of said socket, and a throughbore extending between its opposite end walls, and wherein said adapter is a capture nut which is non-rotatably positioned adjacent to one end wall of said bushing and which has its internally threaded bore aligned with said throughbore, whereby said threaded shank extends through said bushing throughbore such that tightening of said threaded shank into said threaded bore in said capture nut causes axial compression and radial expansion of said bushing for forcibly urging said outer wall surface of said bushing against said inner wall surface of said socket.

7. The anti-roll system of claim 6 further comprising a radial disc positioned against the opposite end wall of said bushing and which engages a terminal end surface of said stabilizer bar adjacent to said socket.

8. The anti-roll system of claim 6 wherein said capture nut includes a radial flange segment which is positioned adjacent to said one end wall of said bushing and a hub segment non-rotatably retained in a retention cavity formed in said bushing.

9. The anti-roll system of claim 2 wherein said locking mechanism further includes a lock sleeve having an outer wall surface which mates with an inner wall surface of said socket, said lock sleeve further including a tapered bore through which said threaded shank is adapted to extend, and wherein said adapter is a wedge nut disposed in said tapered bore in said lock sleeve and has a tapered outer surface which mates with an inner wall surface of said tapered bore, whereby said threaded shank extends through said tapered bore in said lock sleeve such that tightening of said threaded shank into said threaded bore in said wedge nut causes axial movement of said wedge nut relative to said lock sleeve which causes radial expansion of said lock sleeve for forcibly urging said outer wall surface of said lock sleeve against said inner wall surface of said socket.

10. The anti-roll system of claim 9 wherein said outer wall surface of said lock sleeve is tapered to mate with a tapered inner wall surface of said socket.

11. The anti-roll system of claim 9 wherein said lock sleeve is an elongated split-ring component having an expansion slot.

12. The anti-roll system of claim 2 wherein said threaded shank extends from a ball stud having a ball segment retained in a spherical socket mounted in said housing of said end link.

13. The anti-roll system of claim 2 wherein said threaded shank is formed on a bolt extending through a grommet retained in said housing of said end link.

14. An end link adapted for plug-in connection into the hollow end of a stabilizer bar, comprising:
    a housing;
    a fastener having an externally-threaded shank segment extending from said housing; and
    a locking sleeve adapted to be disposed in the hollow end of the stabilizer bar and having an internally-threaded bore, whereby tightening of said threaded shank segment into said threaded bore causes radial expansion of said locking sleeve such that its outer wall surface is forcibly urged into engagement with the inner wall surface of the hollow end of the stabilizer bar.

15. The end link of claim 14 wherein said locking sleeve is an elongated split ring having an expansion slot for permitting radial expansion of said outer wall surface of said locking sleeve in response to tightening of said threaded shank segment into said threaded bore.

16. The end link of claim 14 wherein said threaded bore in said locking sleeve is tapered.

17. An end link adapted for plug-in connection into the hollow end of a stabilizer bar, comprising:
    a housing;
    a fastener having an externally-threaded shank segment extending from said housing;
    a bushing adapted to be disposed in the hollow end of the stabilizer bar and having a throughbore; and
    a capture nut acting on said bushing and having an internally-threaded bore, whereby tightening of said threaded shank into said threaded bore in said capture nut causes said capture nut to move axially relative to said shank segment thereby axially compressing and radially expanding said bushing such that an outer wall surface of said bushing is urged into engagement with the inner wall surface of the hollow end of the stabilizer bar.

18. The end link of claim 17 wherein said capture nut includes a hub segment non-rotatably mounted in a retention cavity formed in said bushing and a radial flange segment acting against an end wall of said bushing.

19. The end link of claim 17 wherein said inner wall surface of said hollow end of said stabilizer bar defines an enlarged cavity.

20. An end link adapted for plug-in connection into the hollow end of a stabilizer bar, comprising:
    a housing;
    a fastener having an externally-threaded shank segment extending from said housing;
    a lock sleeve adapted to be disposed in the hollow end of the stabilizer bar and having a tapered throughbore; and
    an adapter disposed in said tapered throughbore of said lock sleeve and having an internally-threaded bore, whereby tightening of said threaded shank segment into said threaded bore of said adapter causes axial movement of said adapter relative to said shank segment for causing radial expansion of said lock sleeve such that its outer wall surface is forcibly urged into engagement with the inner wall surface of the hollow end of the stabilizer bar.

21. The end link of claim 20 wherein said throughbore in said lock sleeve is conically tapered, and wherein said adapter has a conically tapered outer wall surface which mates with said conically tapered throughbore.

22. The end link of claim 20 wherein said lock sleeve is an elongated split ring having an expansion slot for permitting radial expansion of said outer wall surface of said locking sleeve in response to tightening of said threaded shank segment into said threaded bore.

23. The end link of claim 20 wherein said inner wall surface of the hollow end of said stabilizer bar is formed in a tapered end segment thereof such that a tapered outer wall surface of said lock sleeve engages a tapered inner wall surface of said tapered end segment.

* * * * *